(12) United States Patent
Arseniev et al.

(10) Patent No.: US 9,977,684 B2
(45) Date of Patent: May 22, 2018

(54) SELF-LEARNING LOCALIZATION SERVICE

(71) Applicants: Alexey Arseniev, Hockenheim (DE);
Felix F. Hoefer, Wiesloch (DE)

(72) Inventors: Alexey Arseniev, Hockenheim (DE);
Felix F. Hoefer, Wiesloch (DE)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 13/916,199

(22) Filed: Jun. 12, 2013

(65) Prior Publication Data
US 2014/0372098 A1 Dec. 18, 2014

(51) Int. Cl.
G06F 9/44 (2018.01)
G06F 17/28 (2006.01)

(52) U.S. Cl.
CPC ............ *G06F 9/4448* (2013.01); *G06F 17/28* (2013.01); *G06F 17/289* (2013.01)

(58) Field of Classification Search
None
See application file for complete search history.

(56) References Cited

U.S. PATENT DOCUMENTS

| 4,502,128 | A | 2/1985 | Okajima et al. |
| 4,541,069 | A | 9/1985 | Kanou et al. |
| 4,980,829 | A | 12/1990 | Okajima et al. |
| 5,175,684 | A | 12/1992 | Chong |
| 7,584,216 | B2 | 9/2009 | Travieso et al. |
| 7,657,511 | B2 | 2/2010 | Brookler et al. |
| 7,660,594 | B2* | 2/2010 | Chava ................ H04W 88/184 379/201.01 |
| 7,720,856 | B2 | 5/2010 | Goedecke et al. |
| 8,024,196 | B1 | 9/2011 | Wodtke et al. |
| 8,126,702 | B2 | 2/2012 | Lang et al. |
| 8,489,980 | B2 | 7/2013 | Lakritz |
| 2001/0029455 | A1 | 10/2001 | Chin et al. |

(Continued)

OTHER PUBLICATIONS

Representational state transfer: Online,retrieved from https://web.archive.org/web/20120303175140/http://en.wikipedia.org/wiki/Representational_state_transfer, Mar. 2012.*

(Continued)

Primary Examiner — Pierre-Louis Desir
Assistant Examiner — Yi-Sheng Wang
(74) Attorney, Agent, or Firm — Fish & Richardson P.C.

(57) ABSTRACT

The disclosure generally describes computer-implemented methods, software, and systems for self-learning localization services. A computer-implemented method includes: identifying, at a location remote from a first application, a request for localization of a string value associated with the first application from a source language to a target language, sending the string value to a translation request buffer in response to a determination that the localization of the string value in the target language is unavailable, and triggering, in response to satisfaction of at least one heuristic analysis, a translation process of the string value from the source language into the target language where the string value is retrieved from the translation request buffer. In some instances, the location remove from the first application is a centralized localization service accessible by remote requests from a plurality of applications.

14 Claims, 6 Drawing Sheets

(56) References Cited

U.S. PATENT DOCUMENTS

| | | | |
|---|---|---|---|
| 2003/0074481 A1* | 4/2003 | Fox | G06F 17/30905 719/310 |
| 2003/0115059 A1 | 6/2003 | Jayaratne | |
| 2007/0239880 A1* | 10/2007 | Alperin | H04L 65/1069 709/230 |
| 2009/0070094 A1* | 3/2009 | Best | G06F 17/211 704/2 |
| 2009/0276206 A1* | 11/2009 | Fitzpatrick | G06F 9/4448 704/2 |
| 2012/0239381 A1 | 9/2012 | Heidasch | |
| 2013/0124185 A1* | 5/2013 | Sarr | G06F 17/289 704/2 |
| 2013/0132825 A1 | 5/2013 | Masuko | |

OTHER PUBLICATIONS

Wikipedia "Representational State Transfer" Archive of Feb. 11, 2005.*

Wikipedia page "Representational State Transfer" Jan. 11, 2005 Archive.*

Wikipedia page ("Representational State Transfer" Jan. 11, 2005 Archive).*

U.S. Appl. No. 13/596,516, filed Aug. 25, 2012, Alexey Arseniev et al.

SAP Library, "Translating Objects Directly"; SAP Solution Manager; 5 pages <<http://help.sap.com/saphelp_smehp1/helpdata/en/41/71601b3ab0f34a8e00aa01338c68f3/frameset.htm>> last visited Jun. 11, 2013.

SAP Library, "Translation Tools for Translators (BC-DOC-TTL)"; SAP Solution Manager; 2 pages <<http://help.sap.com/saphelp_smehp1/helpdata/en/41/71601b3ab0f34a8e00aa01338c68f3/frameset.htm>>; last visited Jun. 11, 2013.

SAP Library, "Quick Start for Translators"; SAP Solution Manager; 4 pages; <<http://help.sap.com/saphelp_smehp1/helpdata/en/41/71601b3ab0f34a8e00aa01338c68f3/frameset.htm>>; last visited Jun. 11, 2013.

SAP Library, "Transaction SE63"; SAP Solution Manager; 4 pages; <<http://help.sap.com/saphelp_smehp1/helpdata/en/41/71601b3ab0f34a8e00aa01338c68f3/frameset.htm>>; last visited Jun. 11, 2013.

SAP Library, "Translating Objects Directly"; SAP Solution Manager; 5 pages ; <<http://help.sap.com/saphelp_smehp1/helpdata/en/41/71601b3ab0f34a8e00aa01338c68f3/frameset.htm>>; last visited Jun. 11, 2013.

SAP Library, "Translating Logical Objects"; SAP Solution Manager; 1 page; <<http://help.sap.com/saphelp_smehp1/helpdata/en/41/71601b3ab0f34a8e00aa01338c68f3/frameset.htm>>; last visited Jun. 11, 2013.

SAP Library, "Translating PDF-Based Forms"; SAP Solution Manager; 1 pages; <<http://help.sap.com/saphelp_smehp1/helpdata/en/41/71601b3ab0f34a8e00aa01338c68f3/frameset.htm>>; last visited Jun. 11, 2013.

SAP Library, "IMG Structures"; SAP Solution Manager; 1 pages; <<http://help.sap.com/saphelp_smehp1/helpdata/en/41/71601b3ab0f34a8e00aa01338c68f3/frameset.htm>>; last visited Jun. 11, 2013.

SAP Library, "Translating OTR Texts"; SAP Solution Manager; 1 pages; <<http://help.sap.com/saphelp_smehp1/helpdata/en/41/71601b3ab0f34a8e00aa01338c68f3/frameset.htm>>; last visited Jun. 11, 2013.

SAP Library, "Translating Transport Objects"; SAP Solution Manager; 1 pages; <<http://help.sap.com/saphelp_smehp1/helpdata/en/41/71601b3ab0f34a8e00aa01338c68f3/frameset.htm>>; last visited Jun. 11, 2013.

SAP Library, "Object Type Shortcuts"; SAP Solution Manager; 1 pages; <<http://help.sap.com/saphelp_smehp1/helpdata/en/41/71601b3ab0f34a8e00aa01338c68f3/frameset.htm>>; last visited Jun. 11, 2013.

SAP Library, "Translation Statistics"; SAP Solution Manager; 1 page; <<http://help.sap.com/saphelp_smehp1/helpdata/en/41/71601b3ab0f34a8e00aa01338c68f3/frameset.htm>>; last visited Jun. 11, 2013.

SAP Library, "Personal Work lists"; SAP Solution Manager; 3 pages; <<http://help.sap.com/saphelp_smehp1/helpdata/en/41/71601b3ab0f34a8e00aa01338c68f3/frameset.htm>>; last visited Jun. 11, 2013.

SAP Library, "Proposal Pool"; SAP Solution Manager; 3 pages; <<http://help.sap.com/saphelp_smehp1/helpdata/en/41/71601b3ab0f34a8e00aa01338c68f3/frameset.htm>>; last visited Jun. 11, 2013.

SAP Library, "Short Text Editor"; SAP Solution Manager; 3 pages; <<http://help.sap.com/saphelp_smehp1/helpdata/en/41/71601b3ab0f34a8e00aa01338c68f3/frameset.htm>>; last visited Jun. 11, 2013.

SAP Library, "Long Text Editor"; SAP Solution Manager; 1 page; <<http://help.sap.com/saphelp_smehp1/helpdata/en/41/71601b3ab0f34a8e00aa01338c68f3/frameset.htm>>; last visited Jun. 11, 2013.

SAP Library, "Translation Performance Monitor"; SAP Solution Manager; 1 page; <<http://help.sap.com/saphelp_smehp1/helpdata/en/41/71601b3ab0f34a8e00aa01338c68f3/frameset.htm>>; last visited Jun. 11, 2013.

* cited by examiner

SELF-LEARNING LOCALIZATION SERVICE

TECHNICAL FIELD

The present disclosure relates to methods and systems for self-learning localization services.

BACKGROUND

Client applications have requirements to deliver translated text used in user interface (UI) blocks, messages, and logs, among other locations, to provide text readable by various users. In many cases, the text may be written in a source language and may need to be translated for users who are not fluent in the source language, but instead a particular target language into which the text may need to be provided for understanding.

To provide translated texts, many solutions require offline localization, such that translations must be provided prior to compilation of the associated application. Existing solutions require complex, and in some instances, proprietary infrastructures for passing the original text for localization and do not provide real-time translation of text in a dynamic fashion.

SUMMARY

The disclosure generally describes computer-implemented methods, software, and systems for self-learning localization services. A computer-implemented method includes: identifying, at a location remote from a first application, a request for localization of a string value associated with the first application from a source language to a target language, sending the string value to a translation request buffer in response to a determination that the localization of the string value in the target language is unavailable, and triggering, in response to satisfaction of at least one heuristic analysis, a translation process of the string value from the source language into the target language where the string value is retrieved from the translation request buffer. In some instances, the location remote from the first application is a centralized localization service accessible by remote requests from a plurality of applications.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings and from the claims.

DETAILED DESCRIPTION

Figure 1:
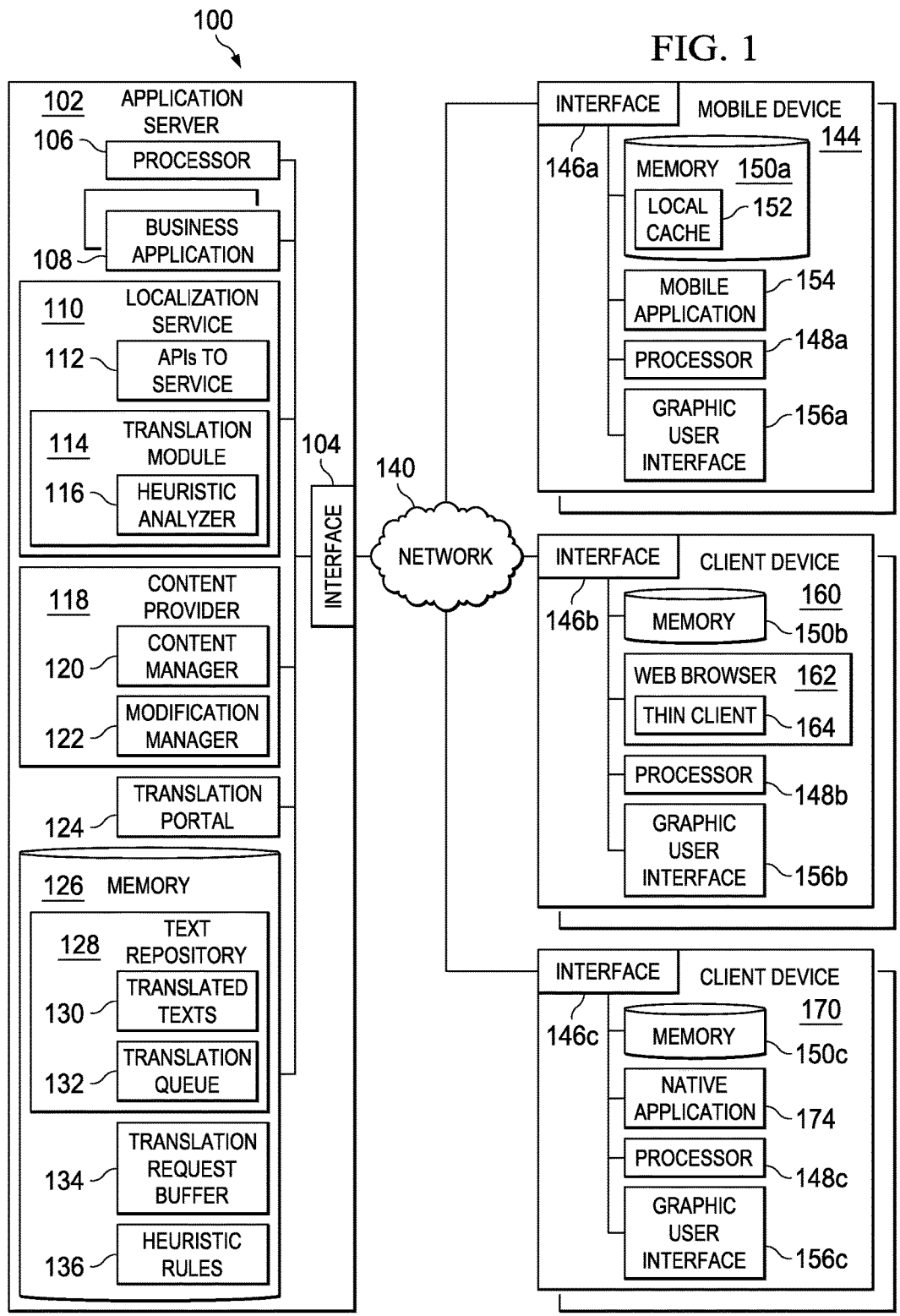
FIG. 1 illustrates an example of a computer system environment for providing a self-learning localization service.

The present disclosure provides tools and systems for a centralized, self-learning localization service that allows client application developers to simplify and minimize software localization tasks by providing a single self-learning solution for delivering localized texts and triggering translations of unknown texts. Specifically, client applications are provided with a backend, web-based system using any suitable remote connection protocol, such as Hypertext Transfer Protocol (HTTP) or Remote Function Cal (RFC), among others, which can be accessed when one or more text strings in a particular client application need local translations (or localizations) for users. In one instance, the solution is a localization application programming interface (API) that delivers localized versions of requested original texts if they are already available or triggers a delayed translation for queried texts, which may be available in response to future requests. The localization service may be associated with an online translation system and may use both manual- and machine-based translations, where appropriate.

The solution provides a number of potential benefits, including but not limited to, the following:
- an on-the-fly and dynamic localization of texts into a plurality of languages;
- a single, centralized service for delivering the localized text and triggering translations, which provides developers with the ability to easily program and include localization options into code;
- a single method of providing localized texts for heterogeneous clients and client types;
- a method for simplifying development of multi jurisdictional applications needing to be localized in different languages;
- a method of delayed translation and content verification which can reduce unnecessary translations, while ensuring needed texts are localized and provided; and
- a method of referencing native text for translation as opposed to by ID, which allows in-place adopting of texts without the need to create redundant IDs and forcing the client application and, therefore, developers, to be aware of the particular localization process, such as a location of localization resources, how to create new localized text, and acceptable format/syntax of requests, among others.

The present solution provides additional assistance to the translation service through use of a translation request buffer. In prior solutions, if a developer identifies a particular string value or text that is not localized in a particular language, then a new entry can be added to a translation system with the source language string, which are then triggered for translation at a later time. If the text is no longer needed, then the request can be deleted and no translation will be performed. In the present solution described herein, consumers of the localization service are unaware that their requests for particular text will trigger backend and background translation work if a prior localization in the target language is not available. If a translation process was triggered for each unavailable text string, a possibility of enormous loads to the translators and translation systems may exist, particularly for applications receiving heavy use. The present system introduces the translation request buffer to collect information on all requests for which no localization exists (either no localization at all, or no localization in the target language), where those requests are placed into a waiting queue. The queue entry may include the information necessary to perform the translation, which may include, for example, the original text, the source (or original) language, an identifier associated with the requested text block, a package name (where appropriate), and the target language associated with the request, among others.

Entries in the translation request buffer are evaluated using one or more heuristic analyses to determine whether translation is to be triggered. The possible heuristic analyses available may be based on any suitable criteria. Example criteria include the count of requests for a particular text (either for a specific target language or for any language), a date of the first request, a date of the last request, a particular IP address or set of addresses associated with one or more of the requests, a particular user from whom a request was received, and a particular role of a user from whom a request is received. In some instances, such as where the present solution is provided to a wide-range of users, priority for translations may be provided to paid users or subscriber requests over those of a user associated with a free account. Priority may be provided to different organizations over others, as well as different types of users over others (e.g., testers of the system may be prioritized over normal users). If a threshold value or triggering result of one or more of the heuristic analyses are met, then the translation process may be triggered. Example heuristic rules may include, for example, a situation where requests are received for a particular string value to be translated into a particular language, such that when requested from two or more different IP addresses over a single week more than 10 times, the heuristic rule is satisfied and the translation is triggered. Alternatively, if the request is received from a paid user who has been guaranteed a specific translation result (e.g., after three requests, guaranteed translations are provided), then a request from the paid user may cause the translation process to be performed after the second request from the user to ensure that the next request from the paid user includes the localized text. Any number of suitable heuristic rules can be defined and/or modified by suitably authorized persons.

In some instances, the present solution can also include an option for an administrator or other authorized user to explicitly flush collected translation requests to the translation system, such as at the end of a development cycle, during a relative downtime or slower usage time, as well as other suitable times. In some instances, the system may support mass prefetching of localized texts to the requesting client. In those instances, a package ID may be used as a filter to identify the set of requests, and can minimize the number of request counts for single localizations on the client side.

FIG. 1 illustrates an example of a computer system environment 100 for providing a self-learning localization service. Specifically, the illustrated environment 100 includes or is communicably coupled with one or more devices 144, 160, 170, an application server 102, and a network 140. In some instances, and while not illustrated in FIG. 1, one or more translation systems may be associated with the application server 102, such that its translation portal 124 can "outsource" translation tasks as needed.

In general, the application server 102 is a server that provides a centralized localization service 110 to a plurality of clients, where localization services are performed and executed via requests from and responses sent to users or clients within and communicably coupled to the illustrated environment 100 of FIG. 1. In some implementations, the application server 102 may store and execute one or more additional business applications 108 in addition to the operations related to the localization service 110, as well as other types of applications. In other implementations, the application server 102 may be a dedicated server meant to store and execute only operations associated with the localization service 110. In some implementations, the application server 102 may comprise a Web server, where the localization service 110 represents one or more Web-based services and/or applications accessed and executed by clients and their applications via the network 140 or directly at the application server 102 to perform the programmed tasks or operations of the localization service 110.

At a high level, the application server 102 comprises an electronic computing device operable to receive, transmit, process, store, or manage data and information associated with the environment 100. Specifically, the application server 102 illustrated in FIG. 1 is responsible for receiving localization requests via one or more APIs 112 associated with the localization service 110 and subsequently providing appropriate responses to each of those requests. In addition to requests from the external client, requests associated with the localization service 110 may also be sent from internal users (e.g., using one of the business applications 108), external or third-party customers, other automated applications, as well as any other appropriate entities, individuals, systems, or computers.

As used in the present disclosure, the term "computer" is intended to encompass any suitable processing device. For example, although FIG. 1 illustrates a single application server 102, environment 100 can be implemented using two or more such servers, as well as computers other than servers, including a server pool. Indeed, application server 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated application server 102 may be adapted to execute any operating system, including Linux, UNIX, Windows, Mac OS®, Java™, Android™, iOS or any other suitable operating system. According to one implementation, application server 102 may also include or be communicably coupled with an e-mail server, a Web server, a caching server, a streaming data server, and/or other suitable server or computer.

In the present illustration, the application server 102 hosts and/or supports the localization service 110, the related content provider 118, and a translation portal 124. The localization service 110 and its APIs 112 represent a centralized location where one or more applications (e.g., mobile application 154, thin client 164, and native application 174) can direct localization requests associated with their executing processes. The illustrated localization service 110 operates in concert with the content provider 118 to perform the operations of searching for available localizations of text that matches the received requests from a particular application, and if no such localization is available, placing the text associated with the received request (along with other identifying information, such as the source and target languages of the text into which the translation is to be requested) into a translation request buffer 134.

The localization service 110 is also illustrated as including a translation module 114, where the translation module 114 can manage the translations to be performed by either performing the translation itself or by sending the text and associated information to another suitable component, such as the translation portal 124. The translation module 114 can determine when a translation is to be performed based on one or more heuristic rules 136 (illustrated as stored in memory 126) as evaluated by the heuristic analyzer 116. Specifically, the heuristic analyzer 116 can evaluate a particular request for translation, as well as information related to other requests for the same or similar translations. One or more predefined heuristic rules 136 can be used to determine whether the analysis initiates translation of the text (i.e., if a particular rule or threshold associated with the rule is satisfied), or if the text associated with the translation is placed into or remains within the translation request buffer 134. In some instances, the translation module 114 may be external to the localization server 110, and may perform translation operations or delegate those operations to a suitable translation system or operator. In some instances, the heuristic analyzer 116 may remain a part of the localization service 110 even where the translation module 114 is separate from the localization service 110.

The content provider 118 is responsible for several operations associated with the localization process. As illustrated, the content provider 118 includes a content manager 120 and a modification manager 122. The content manager 120 is used to search previously localized texts in the text repository 128 (and specifically, the set of translated texts 130) when a request is received. If previous translations exist, the content provider 118 can provide the translation to the localization service 110, which can then return the translation to the requesting client. If no such previous localization exists and the translation module 114 determines that one or more of the heuristic analyses have been satisfied, the modification manager 122 of the content provider 118 can place the text (and related information regarding the translation) into the translation queue 132 for later processing. The translation module 114 or the translation portal 124 can access the translation queue 132, when processing time is available, to translate the requested text and add the localized version of the text into the set of translated texts 130. When the next request for that particular localization is received from a client, the content manager 120 can retrieve the new localization and return it to the client. In some instances, the content provider 118 may be a part of the localization service 110, while in other instances, the localization service 110 may be part of the content provider 118.

The translation portal 124 may be a UI interface for a translator or part of a translation system where actual translation (either automatic or manual) can be performed. In various implementations, the translation portal 124 may be a separate program or application from the localization service 110, it may be one of or part of the business applications 108, or an external service with access to the text repository. In some instances, the translation portal 124 may be a part of the translation module 114. As mentioned above, the translation module 114 may be located apart from the localization server 110, interacting with the localization server 110 when the heuristic analyzer 116 (when still a part of the localization service 110) determines a translation should be performed. More than one translation module 114 and/or translation portal 124 may be used in a particular system. For example, many alternative services and companies performing text translations and localizations may be used, with some coordination module or program (not illustrated) determine which translation particular services should perform the translation at the time when translation is triggered. In some instances, such entries may be defined as associated with a particular translation service within the translation queue 132, or multiple queues may be provided for each of the translation services.

As illustrated, the application server 102 includes an interface 104, a processor 106, and a memory 126. The interface 104 is used by the application server 102 for communicating with other systems in a distributed environment—including within the environment 100—connected to the network 140, for example, one of the mobile device 144, client device 160, or client device 170, as well as other systems communicably coupled to the network 140 (not illustrated). Generally, the interface 104 comprises logic encoded in software and/or hardware in a suitable combination and operable to communicate with the network 140. More specifically, the interface 104 may comprise software supporting one or more communication protocols associated with communications such that the network 140 or the interface's hardware is operable to communicate physical signals within and outside of the illustrated environment 100.

As illustrated in FIG. 1, the application server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the application server 102. Specifically, the processor 106 executes the functionality required to receive and respond to requests from the various devices, including the execution of the business applications 108, the localization service 110, the content provider 118, and the translation portal 124.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The application server 102 includes a memory (or multiple memories) 126. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the application server 102, such as the text repository 128, the translation request buffer 134, and the heuristic rules 136. Additionally, the memory 126 may include any other appropriate data, such as VPN applications, firmware logs and policies, firewall policies, a security or access log, print or other reporting files, as well as others.

Network 140 facilitates wireless or wireline communications between the components of the environment 100 (i.e., between the application server 102 and the one or more clients/devices), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the components associated with the application server 102 may be included within network 140 as one or more cloud-based services or operations. For example, at least a portion of the application server 102 and its localization service 110 may be within the network 140, and operated at least partially within a cloud-based system. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The illustrated environment of FIG. 1 also includes the mobile device 144, the client device 160, and the client device 170. Each of these devices may be any computing device operable to connect to or communicate with at least the application server 102 via the network 140 using a wireline or wireless connection. In general, the devices (144, 160, and 170) comprise electronic computer devices operable to receive, transmit, process, and store any appropriate data associated with the environment 100 of FIG. 1. These devices can connect to the localization service 110 either directly or with the help of a client-based wrapper. Connections between the clients/devices and the localization service 110 can be established, for instance, using HTTP or RFC protocols depending on client technologies and implementation preferences. Client wrappers can implement request caching, grouping of requests, and simplifying of the API, such as by filling default parameters and serves to pass the text request from the client-side applications to the server-side localization service 110.

Each of the devices respectively include an interface (146*ac*), processor (148*a-c*), and memory (150*a-c*). The interfaces 146*a-c* are used by the devices to communicate with other systems in a distributed environment—including within the environment 100—connected to the network 140, for example, the application server 102, as well as other systems communicably coupled to the network 140 (not illustrated). The interfaces 146*a-c* may be similar to or different from interface 104 described in association with application server 102. Similarly, processors 148*a-c* may be similar to or different from processor 106, where the processors 148*a-c* are used to execute mobile application 154, web browser 162, thin client 164, and native application 174, respectively. Memories 150*a-c* may also be similar to or different from memory 126. As illustrated, memory 150*a* includes a local cache 152. The local cache 152 may include various data, including one or more text strings or string values to be sent to the localization service 110 (either individually or as a batch request), as well as translations that have been made for previously-requested strings, thereby removing the need for the respective applications to re-request such translations once the request has been filled.

Further, each of the illustrated devices includes a graphical user interface (GUI) 156*a-c*. The GUI 156*a-c* interfaces with at least a portion of the environment 100 for any suitable purpose, including generating a visual representation of a Web browser 162 and thin client 164, native application 174, or mobile application 154. In particular, the GUIs 156*a-c* may be used to view and navigate various Web pages located both internally and externally to the application server 102, as well as information related to the localization process. The GUIs 156*a-c* associated with each device and application may comprise a graphical user interface operable to, for example, allow the user of the respective device or application to interface with at least a portion of the localization service 110 and its associated operations and functionality, as well as other applications. Generally, the GUIs 156*a-c* provides the particular user with an efficient and user-friendly presentation of business data provided by or communicated within the system. The GUIs 156*a-c* may comprise a plurality of customizable frames or views having interactive fields, pull-down lists, and buttons operated by the user. Generally, the GUIs 156*a-c* may also provide general interactive elements that allow a user to access and utilize various services and functions of one or more applications. The GUIs 156*a-c* may present information associated with the respective applications for viewing and interaction. In general, the GUIs 156*a-c* are often configurable, support a combination of tables and graphs (bar, line, pie, status dials, etc.), and are able to build real-time portals, where tabs are delineated by key characteristics (e.g., site or micro-site). Therefore, the GUIs 156*a-c* contemplate any suitable graphical user interface, such as a combination of a generic web browser, intelligent engine, and command line interface (CLI) that processes information in the platform and efficiently presents the results to the user visually.

The mobile application 154 may include native clients for iOS, Android, Windows Mobile, Blackberry BB10, or any other mobile technology. Web browser 162 may include Internet Explorer, Firefox, Chrome, Safari, among others, and thin client 164 may comprise, for example, an HTML-based client built using UI5 libraries or proprietary AJAX-based engines or Flash-based clients. Native application 174 may include a rich client or application for Windows, Linux, or Mac OS X, among others, including proprietary applications such as SAP's SAP GUI for Windows/Java or NetWeaver Business Client for Desktop/Java. In general, the devices and their respective applications are meant to be representative. Any suitable device and/or client application or client may take advantage of the localization service 110 if it can provide suitable localization requests to the localization service 110.

There may be any number of client or mobile devices associated with, or external to, the environment 100. For example, while the illustrated environment 100 includes three client devices, alternative implementations of the environment 100 may include multiple client devices communicably coupled to the network 140 and/or the application server 102, or any other number suitable to the purposes of the environment 100. Additionally, there may also be one or more additional client devices external to the illustrated portion of the environment 100 that are capable of interacting with the environment 100 via the network 140. Further, the term "client" and "user" and "administrator" may be used interchangeably as appropriate without departing from the scope of this disclosure. Moreover, while the client devices are described in terms of being used by a single user, this disclosure contemplates that many users may use one computer or that one user may use multiple computers.

The illustrated client devices are intended to encompass any computing device such as a desktop computer, laptop/notebook computer, wireless data port, smart phone, personal data assistant (PDA), tablet computing device, one or more processors within these devices, or any other suitable processing device. For example, the client devices may comprise a computer that includes an input device, such as a keypad, touch screen, or other device that can accept user information, and an output device that conveys information associated with the operation of the application server 102 or the client device itself, including digital data, visual information, or a GUI.

Figure 2:
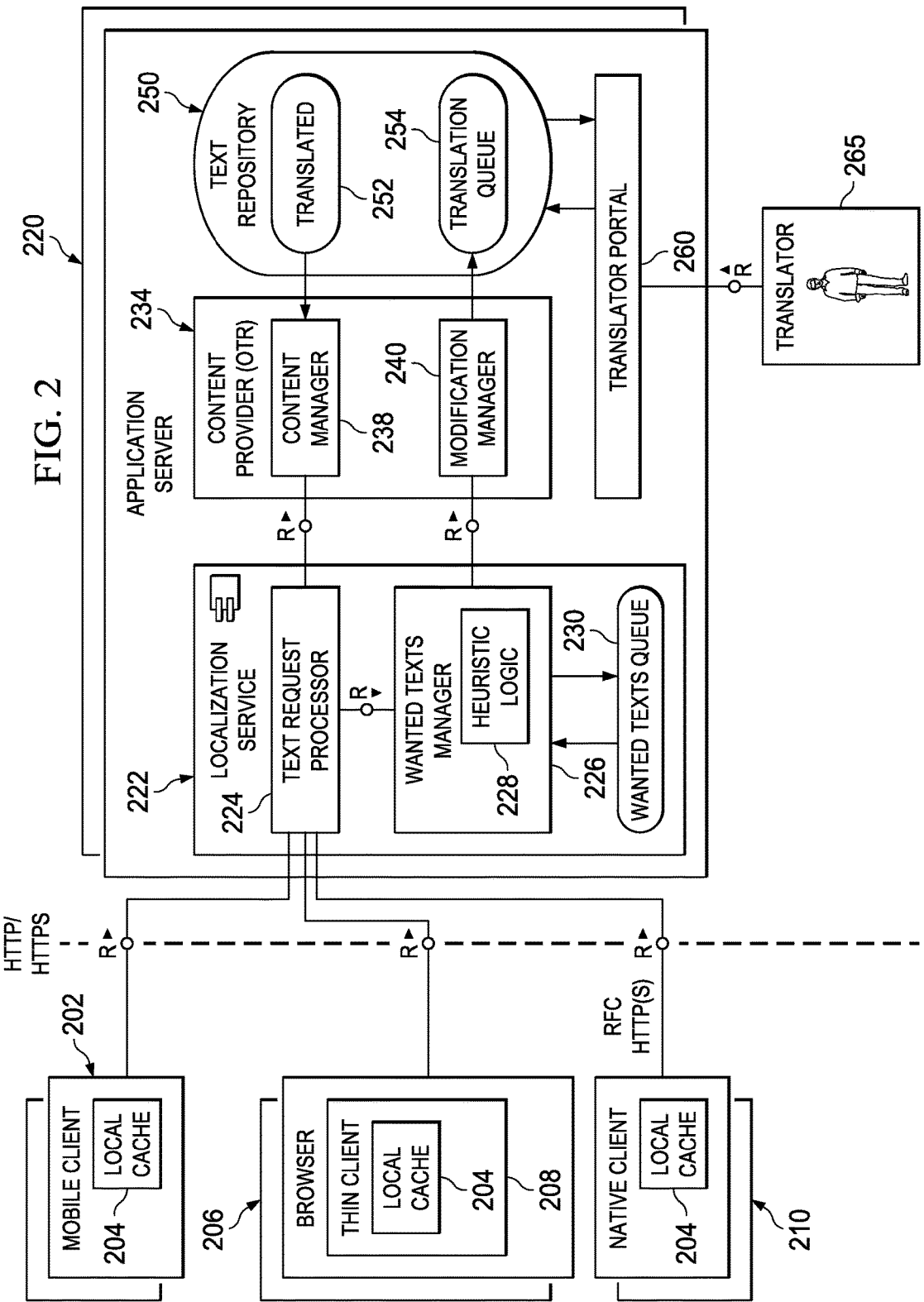
FIG. 2 illustrates a diagram of an alternative example environment providing and supporting a self-learning localization service.

FIG. 2 illustrates a diagram of an alternative example environment providing and supporting a self-learning localization service. Portions of FIG. 2 are similar to those described in FIG. 1, while others are different. Various implementations for the self-learning localization service are intended for the present disclosure, and FIG. 2 represents one possible implementation.

As illustrated and described in FIG. 1, any number of clients and devices can interact with the localization service 222, including the mobile client 202, web browser 206 (and thin client 208), and the native client 210 to request localization of particular texts and to receive responsive translations or responses indicating that the localizations are currently unavailable. As illustrated in mobile client 202, local caches 204 may be included in or associated with the different clients to ensure that any previously received localization is used in the future without requiring additional requests to the localization service 222. In some instances, the local caches 204 may also store request-related information prior to sending the requests, as well as multiple requests to be sent in a single batch request. Correspondence with the localization service 222 can be performed via RFC, HTTP(S), or any other suitable protocol.

Requests can be received at a text request processor 224, a part of the localization service 222, which can provide plugs for receiving and processing HTTP requests, such as a Representational State Transfer (REST) API or RFC-enabled function modules. While FIG. 2 illustrates the localization service 222 and other portions within a single application server 220, one or more components and/or servers may work together to provide the described functionality. The text request processor 224 can redirect text localization requests to the content provider 234 if the requested text is already localized. If the text has not been previously localized, the text request processor 224 can send the text to the wanted texts manager 226, where the text is queued for translation.

The wanted texts manager 226, also a part of the localization service 222, acts as a translation buffer that collects not yet localized texts, or at least those not found by the content manager 238 in the translated texts repository 252 (within the text repository 250), which delays triggering of the text translation until one or more heuristic analyses upon the requested text are met. Texts not to be immediately translated are placed into the wanted texts queue 230. As illustrated, the wanted texts manager 226 may include or be associated with a set of heuristic logic 228 defining the heuristic rules to be satisfied prior to triggering the translation process for a particular text. As described above, the heuristic rules can be related to any suitable aspect of the requested text, the request itself, as well as the user associated with the request, the role of the user associated with the request, among others. In some instances, the heuristic analysis is performed when requests are received (e.g., when a second request for a particular text is received). In others, one or more of the heuristic analyses may be performed on a periodic schedule or in response to another triggering event. In still other instances, a user of sufficient authorization may request the purging of the entire wanted texts queue 230, forcing each of the remaining texts to be placed in the translation queue 254 (within the text repository 250) for translation.

The modification manager 240 can manage the translation process in some instances, receiving texts, source and target languages, and other relevant information from the wanted texts manager 226 when a particular text is to be localized/translated. The modification manager 240 can place the text and its relevant information into a translation queue 254, where those texts are then processed accordingly.

As illustrated, the translator portal 260 represents a UI interface for translators, as well as an automatic entry point into the translation queue 254, from which the actual translation is performed. In some instances, one or more translators 265 may use the translator portal 260 to, in turn, access the translation queue 254. Additionally, the translator portal 260 may be linked to or otherwise associated with an automatic translation system for at least some of the translations to be performed, such that the automatic system can interact with the translator portal 260 (or directly with the translation queue 254 itself). As translations are completed, either manually or automatically, the translated texts are placed into the translated texts repository 252, from which later localization requests can be satisfied after the content manager 238 retrieves them from there.

Figure 3:
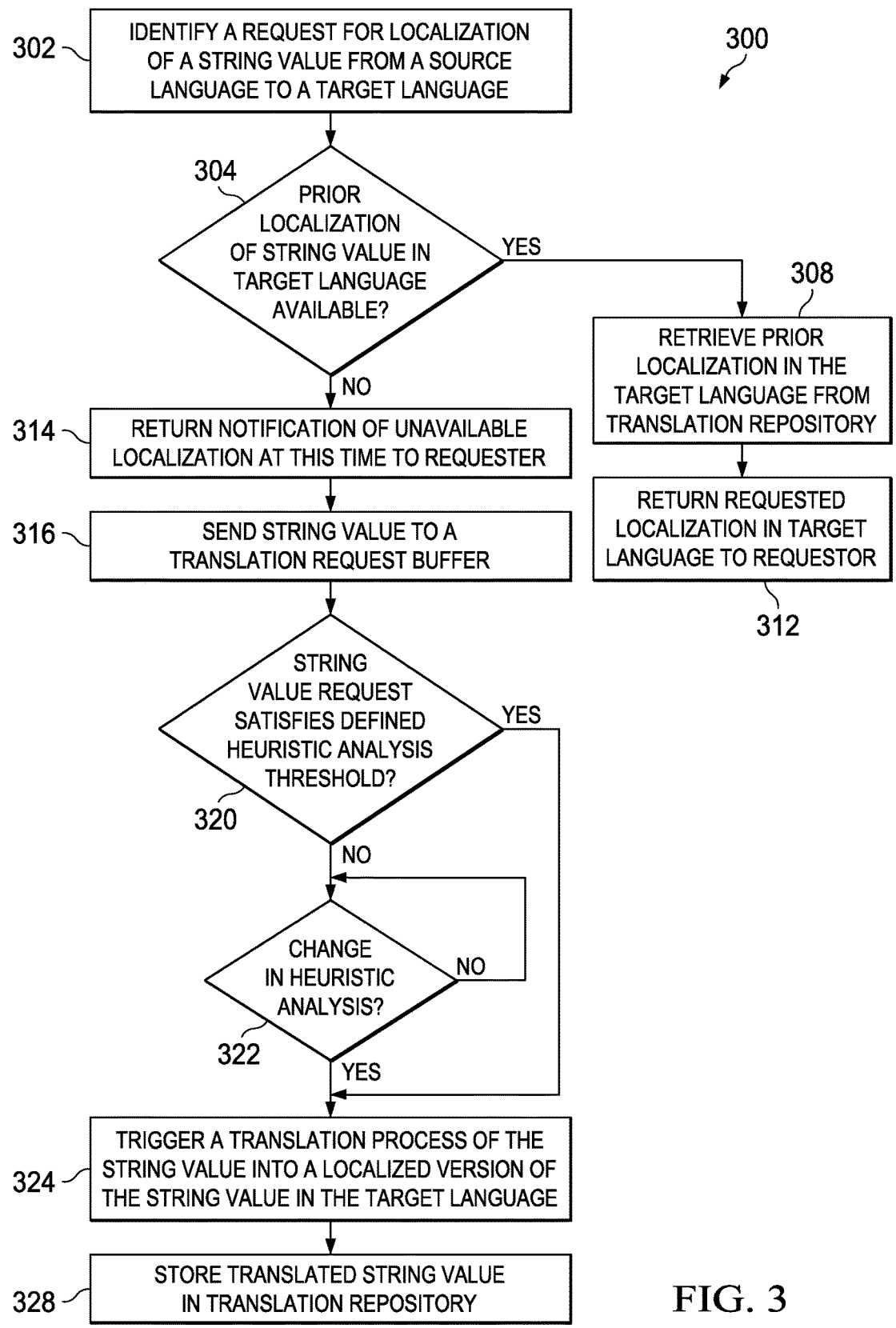
FIG. 3 illustrates an example method for performing a self-learning localization service in one implementation of the present disclosure.

FIG. 3 illustrates an example method 300 for performing a self-learning localization service in one implementation of the present disclosure. For clarity of presentation, the description that follows generally describes method 300 in the context of FIG. 1. However, it will be understood that method 300 may be performed, for example, by any other suitable system, environment, software, and hardware, or a combination of systems, environments, software, and hardware, as appropriate. For example, one or more of the application server, the client, or other computing devices (not illustrated) can be used to execute method 300.

At 302, a request for localization of a string or text value is identified, requesting localization of the string value from a source language to a target language. At 304, a determination is made as to whether the requested string value has previously been localized into the target language and is available. In some instances, this search may be performed, for instance, by the content manager 120 by searching the text repository 128 of FIG. 1. If the prior localization is available, method 300 continues at 308. At 308, the prior localization of the text in the target language is retrieved from a translation repository. At 312, the localization in the target language is returned to the requesting application. If, however, the localization was not available at 304, method 300 continues to 314.

At 314, a notification is sent to the requester that a localization as requested is currently unavailable. In some instances, the notification may be delayed until after the heuristic analysis of 320 is performed. In those instances, the notification may include information on whether the localization requested is being added to the translation queue or not, as well as any other relevant information. At 316, the string value is sent to a translation request buffer for future translation. In some instances, the string value may be sent to the buffer along with an identification of the source language of the text, the target language for the localization, as well as other information of assistance to the translation process. At 320, a determination is made as to whether the request to translate the string value satisfies one or more defined heuristic analyses, or a particular heuristic analysis threshold. As described above, the heuristic analysis may be based on any suitable criteria associated with the request and/or the string value, including the number of times the string value has been requested, the particular user or source of the request, as well as others. If the heuristic analysis is satisfied, method 300 continues at 324. If not, method 300 continues at 322, where a determination is made as to whether there has been a change to heuristic analysis. In some instances, the determination at 322 may not be performed until a new request for the string value is received. In other instance, periodic re-running of the heuristic analysis may be performed to ensure no changes have occurred. Should no changes occur, method 300 returns to 322, where the process may be continued. If a change does occur, method 300 can continue to 324.

At 324, a translation process of the string value from the source language into the localized target language may be triggered. This process may include placing the string value and an identification of its source and target languages into a translation queue, where one or more manual or automatic translation systems can perform the translation. In some instances, the translation process may only translate the string value into the target language. In other instances, when the translation process is triggered, one or more additional and non-requested localizations may be triggered as well. For example, a determination may be made that English text requested for a German localization is also typically translated into French. In those instances, when a German localization is performed, the system may also trigger a translation in French in anticipation of a later French request. Such settings may be defined by administrators, developers, and others with suitable credentials. In some instances, a set of translation rules may be defined that ensure such multi-language translations occur. Such rules may be defined to only be used for particular users (e.g., testers, certain users with specific preferences or historical usage, etc.), while other users will only trigger the single language localization. At 328, the translated string values are stored in a translation repository where such localizations can be provided in response to later requests for the particular localization.

Figure 4A:
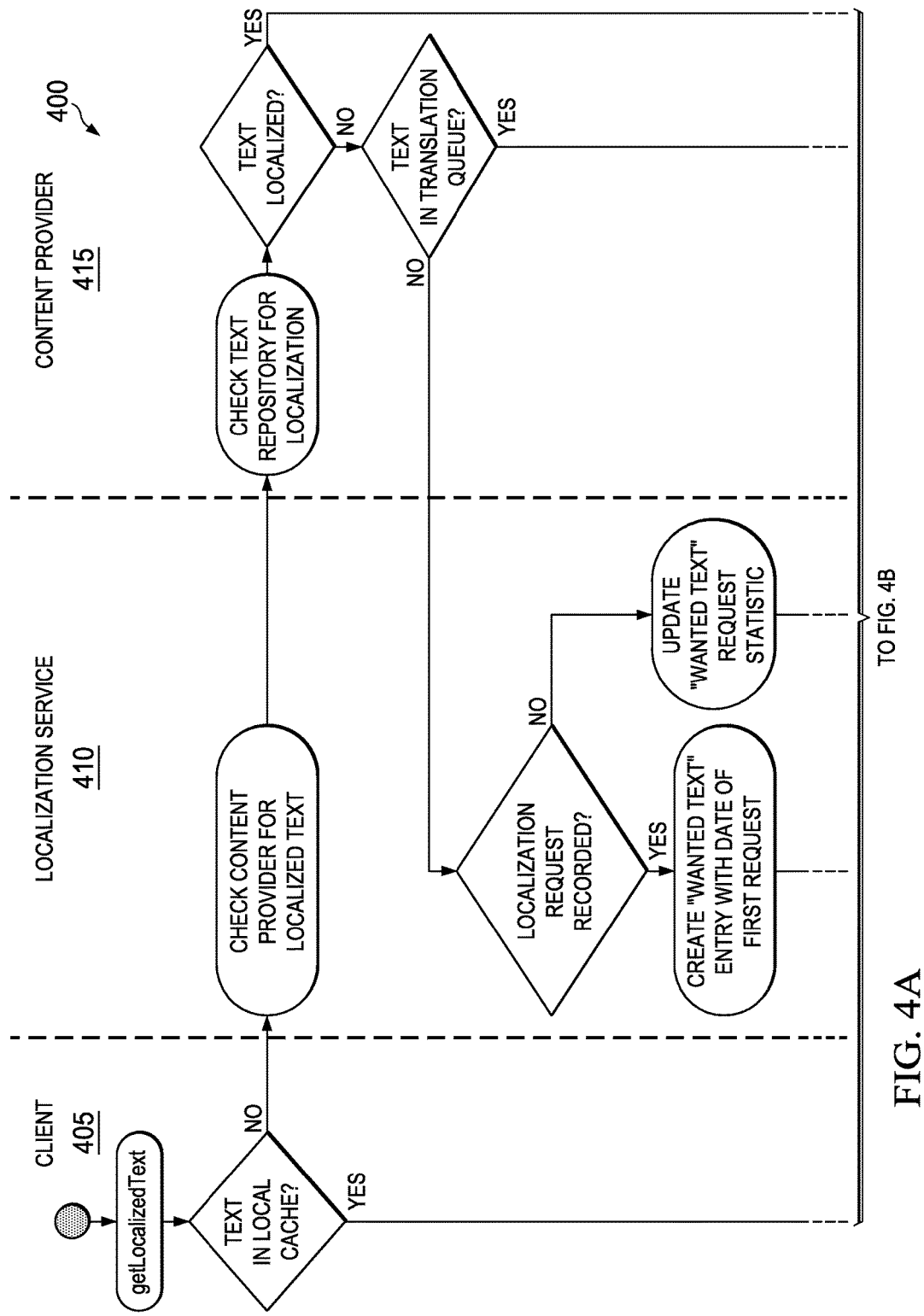
FIGS. 4A and 4B illustrate an example swim-lane activity diagram illustrating an example activity flow in one implementation of the present disclosure.
Figure 4B:
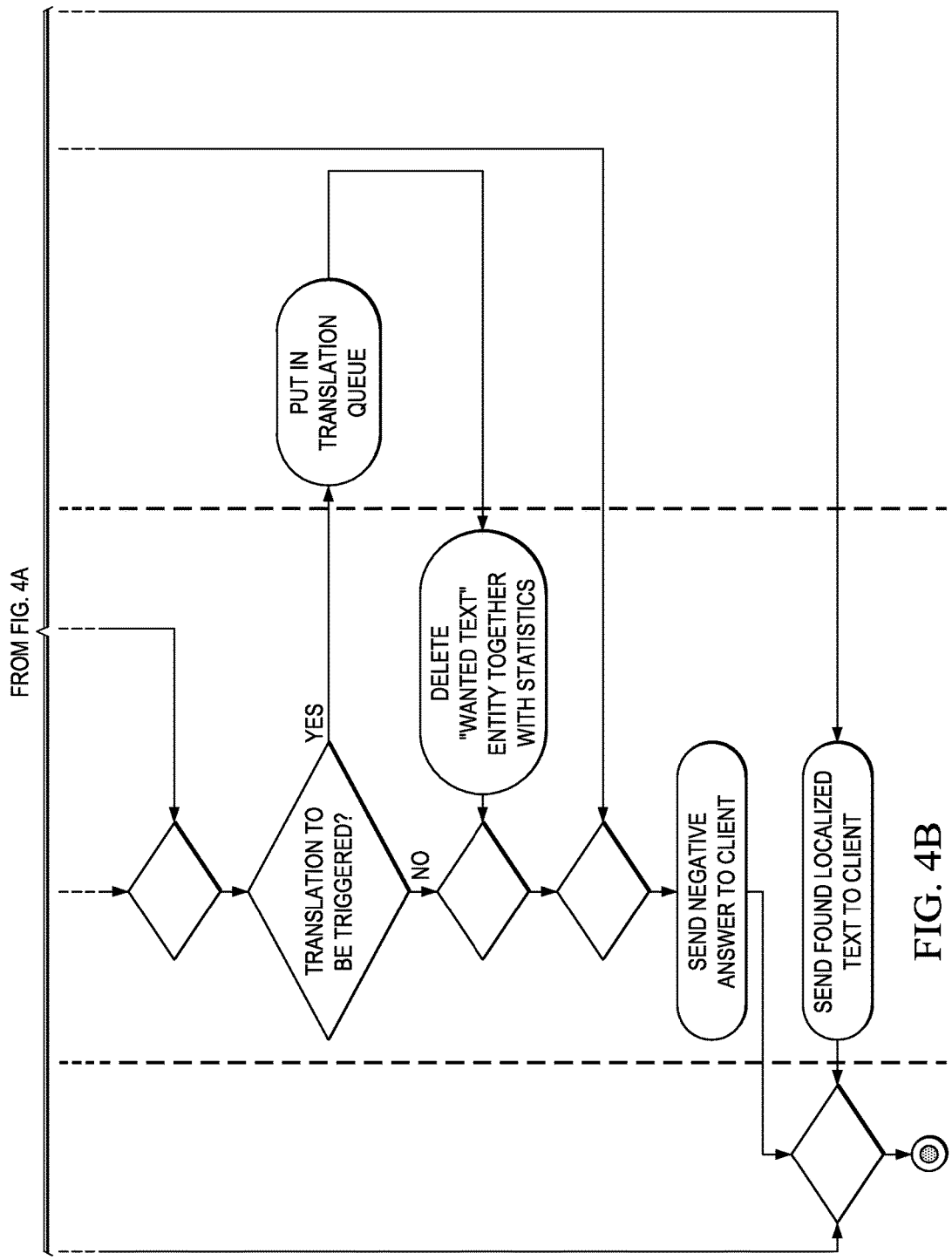

FIGS. 4A and 4B illustrate an example swim-lane activity diagram 400 illustrating an example activity flow in one implementation of the present disclosure. Activity diagram 400 is described in terms of three actors, client 405, localization service 410, and content provider 415. Alternative and/or additional components may also be used in other implementations, as the illustration of diagram 400 is meant to be an example.

Initially, the client 405 determines a localization of certain text is needed and initiates a getLocalizedText function. In the illustrated instance, the getLocalizedText function searches a local text cache (e.g., local cache 152 of FIG. 1) to determine if a previous localization request for the same text had been returned by the localization service 410 and stored locally for later use at the client 405. If so, the cached localized text can be used and the process ends. If, however, the localized text is not available, then a request is sent to the localization service 410.

In response to receiving this request, the localization service 410 can check with the content provider 415 to determine if the localized text in the target language is available there. As illustrated, the localization service 410 can call a findLocalization method at the content provider 415, such that the content provider 415 checks a text repository for the requested localization of the text. If the localized text is found, then the content provider 415 returns the localized text to the localization service 410, which then sends the found localized text to the client 405 for use in its application.

If, however, the content provider 415 cannot locate the localization, then the content provider 415 determines whether the requested text is already included in a translation queue for translation. If the request is pending translation in the translation queue, then the content notifies the localization service 410, which will in turn notify the client 405 that the text is not yet available but is queued for translation. Alternatively, if the translation request is not pending in the translation queue, the content provider 415 notifies the localization service 410 of this. The localization service 410 then determines whether a prior localization request has already been received and recorded within the system. If not, an entry associated with the request is placed into a wanted text repository with the date of the first request. Other information associated with the request and the requester can also be recorded with the wanted text entry. If, however, a prior request for the localized text has been received, then the prior entry in the wanted text repository can be updated with information from the new request.

Once the updated or new entry is made, a heuristic analysis of the entry in the wanted text repository can be performed. If the statistics and request-related information satisfy one or more heuristic rules, then the localization service 410 can request that the content provider 415 place the text into the translation queue for subsequent translation. Once placed into the translation queue, the content provider 415 can notify the localization service 410, which can in turn remove the wanted text entry and its associated statistics from the wanted text repository. If, on the other hand, the heuristic analysis is not satisfied for the requested text, then a negative response is provided to the client 405 indicating that the text is not localized yet.

The activity diagram 400 illustrates a single trip through the process. Later requests for the same text may result in the translation being available and returned by the localization service 410, while other requests may assist the text in satisfying the heuristic analysis such that the translation process is triggered, and such that the next request for the text can be successful. Alternative and additional operations and determinations can be performed in other implementations.

Figure 5:
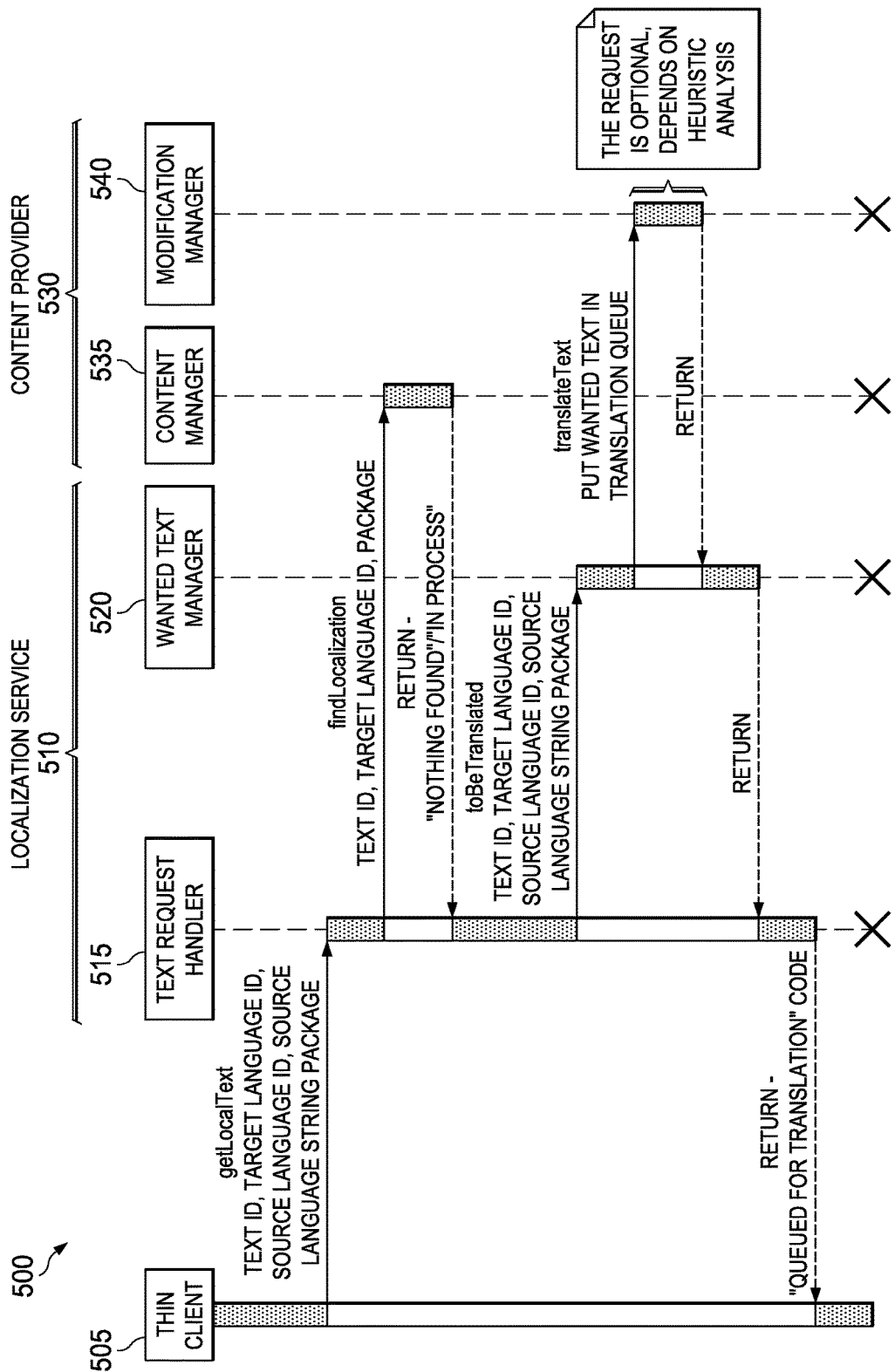
FIG. 5 illustrates an example sequence diagram associated with a self-learning localization service.

FIG. 5 illustrates an example sequence diagram 500 associated with a self-learning localization service. For clarity of presentation, the description that follows generally describes diagram 500 in the context of FIG. 2. However, it will be understood that diagram 500, or variations thereon, could be used with any suitable system, environment, software, and hardware, or a combination of systems, environments, software, and hardware, as appropriate. In the illustrated example, thin client 505, localization service 510 (including text request handler 515 and wanted text manager 520), and content provider 530 (including content manager 535 and modification manager 540) are illustrated.

The client-side application, here the thin client 505, requests localization of a particular text string. The illustrated request includes a text ID, a target language ID, a source language ID, a source language string, and a package reference. Additional and/or alternative information may be included in other requests, including a user ID or role, an IP address, or information related to particular request's urgency or priority. In some instances, the request may include a hint for translators, which can provide context information associated with the text requested to assist with better translations. The request from the thin client 505 may be sent as an HTTP or RFC request to the text request handler 515.

The text request handler 515 checks for an existing localization of the requested text by requesting the content from the content manager 535. The request includes at least a portion of the parameters from the original request. Here, the text ID, the target language ID, and the package are sent. In other instances, the actual source text, as well as other identifying text, may also be provided.

In the present example, the content manager 535 cannot identify the localization of the requested text, and returns a negative result to the text request handler 515. Because of the missing localization report from the content manager 535, the text request handler 515 forwards the localization request to the wanted text manager 520 for delayed translation. The request as illustrated includes the information initially received from the thin client 505, including the text ID, the target language ID, the source language ID, the source language string, and the package. Based on the results of the heuristic analysis described in prior figures, the wanted text manager 520 determines if translation should be triggered for the requested text. In the illustrated example, the wanted text manager 520 determines that the heuristic analysis is satisfied, and sends a request to the modification manager 540 to initiate the translation by placing the text and related information into a translation queue associated with the corresponding backend translation system. After trigging the translation, the text request handler 515 can notify the requesting thin client 505 that the text has been queued for translation. Had the text already been localized as requested, the text request handler 515 can provide the localized text and associated information back to the thin client 505. If the text was not found but also is not added to the translation queue, a corresponding notification of unavailability can be returned to the thin client 505, which can then provide, in some instances, a notification to the user of the application.

In some instances, where a request is not sent to the translation queue based on the heuristic decision, the end user may be provided a UI indicating such a result. That UI may include, in one example, a button, trigger, or other UI element where the user may be able to explicitly trigger the translation. In such instances, receiving the user's selection of such a trigger may initiate, via the corresponding localization service, an immediate triggering of the translation process. While the results may not be immediately available to the user, the localization process can begin and be available in the time it takes for a translation to occur. In some instances such a trigger may provide a higher priority to the request, such that the translation is moved to or near the top of the translation queue, thereby providing a relatively faster translation and available localization process.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method executed by one or more processors, the method comprising:
   identifying, by at least one of the one or more processors, at a location remote from a first application, a request for localization associated with a particular user of a string value associated with the first application from a source language to a target language, the request received via a network connection;
   transmitting, via the network connection, the string value to a translation request buffer in response to a determination that the localization of the string value in the target language is unavailable, wherein the translation is delayed until a determination of satisfaction of at least one heuristic analysis; and
   in response to satisfaction of at least one heuristic analysis, automatically triggering a translation process of the string value from the source language into the target language within a translation module, the string value retrieved from the translation request buffer, where a first heuristic analysis is satisfied based on receiving the identified request and having previously received at least one prior request for localization of the same string value from the source language to the target language, where the number of received requests exceeds a predetermined threshold value of requests, and wherein a second heuristic analysis is satisfied based on a determination that an identity or role of the particular user associated with the request for localization corresponds to a priority translation, wherein the second heuristic analysis causes the automatic triggering of the translation process regardless of whether the first heuristic analysis is satisfied; and in response to determining that no heuristic analysis is satisfied and that no prior localization of the string value from the source language to the target language has been previously translated, transmitting, via the network connection, a notification of unavailability of the requested localization in a translation repository to the particular user.

2. The method of claim 1, further comprising storing the translated string value in the target language to the translation repository, the translated string value in the target language associated with the string value in the source language in the translation repository.

3. The method of claim 1, further comprising, in response to identifying the request:
    searching a translation repository for a prior localization of the string value from the source language to the target language;
    sending the string value to the translation request buffer and returning a negative response to the first application in response to the determination that the localization of the string value in the target language is unavailable; and
    retrieving a prior localization of the string value in the target language from the translation repository and returning the prior localization to the first application in response to the determination that the localization of the string value in the target language is available.

4. The method of claim 1, wherein the location remote from the first application comprises a centralized localization service, the centralized localization service accessible by remote requests from a plurality of applications, and wherein the centralized localization service is accessible as a REST-based application programming interface or a remote function call-enabled function module.

5. The method of claim 1, wherein the identified request includes a text ID, a target language ID, a source language ID, and the string value in the source language.

6. The method of claim 1, wherein triggering the translation process of the string value in response to the satisfaction of the at least one heuristic analysis includes triggering the translation process of the string value from the source language into the target language and at least one other language different than the target language.

7. The method of claim 1, wherein, prior to triggering the translation process of the string value from the source language into the target language in response to satisfaction of the at least one heuristic analysis and after the determination that the localization of the string value in the target language is unavailable, the request for localization of the string value from the source language to the target language is maintained in the translation request buffer.

8. A system, comprising:
    at least one processor;
    a computer-readable storage medium coupled to the at least one processor having instructions stored thereon which, when executed by the at least one processor, cause the at least one processor to perform operations comprising:
        identifying, by the at least one processor, at a location remote from a first application, a request for localization associated with a particular user of a string value associated with the first application from a source language to a target language, the request received via a network connection;
        transmitting, via the network connection, the string value to a translation request buffer in response to a determination that the localization of the string value in the target language is unavailable, wherein the translation is delayed until a determination of satisfaction of at least one heuristic analysis; and
        automatically triggering a translation process of the string value from the source language into the target language, the string value retrieved from the translation request buffer, the triggering performed in response to satisfaction of at least one heuristic analysis, where a first heuristic analysis is satisfied based on receiving the identified request and having previously received at least one prior request for localization of the same string value from the source language to the target language, where the number of received requests exceeds a predetermined threshold value of requests, and wherein a second heuristic analysis is satisfied based on a determination that an identity or role of the particular user associated with the request for localization corresponds to a priority translation, wherein the second heuristic analysis causes the automatic triggering of the translation process regardless of whether the first heuristic analysis is satisfied; and
    wherein automatically triggering the translation process of the string value from the source language into the target language in response to the satisfaction of the at least one heuristic analysis further includes automatically triggering the translation process of the string value from the source language into the target language and at least one other particular language different than the target language based on the automatic triggering of the translation process in the target language, where the at least one other particular language is not included in the identified request for localization.

9. The system of claim 8, the operations further comprising returning a negative response related to the request for the localization to the first application in response to determining that the localization of the string value in the target language is unavailable.

10. The system of claim 8, the operations further comprising storing the translated string value in the target language to a translation repository, the translated string value in the target language associated with the string value in the source language in the translation repository.

11. The system of claim 8, further comprising, in response to identifying the request:
    searching a translation repository for a prior localization of the string value from the source language to the target language;
    sending the string value to the translation request buffer and returning a negative response to the first application in response to the determination that the localization of the string value in the target language is unavailable; and
    retrieving a prior localization of the string value in the target language from the translation repository and returning the prior localization to the first application in response to the determination that the localization of the string value in the target language is available.

12. The system of claim 8, wherein the location remote from the first application comprises a centralized localization service, the centralized localization service accessible by remote requests from a plurality of applications.

13. The system of claim 8, wherein the identified request includes a text ID, a target language ID, a source language ID, and the string value in the source language.

14. A computer program product embodied in a non-transitory computer-readable storage medium and comprising instructions that when executed by at least one processor to perform operations comprising:

identifying, by the at least one processor, at a location remote from a first application, a request for localization associated with a particular user of a string value associated with the first application from a source language to a target language, the request received via a network connection;

transmitting, via the network connection, the string value to a translation request buffer in response to a determination that the localization of the string value in the target language is unavailable, wherein the translation is delayed until a determination of satisfaction of at least one heuristic analysis;

in response to satisfaction of at least one heuristic analysis, automatically triggering a translation process of the string value from the source language into the target language, the string value retrieved from the translation request buffer, where a first heuristic analysis is satisfied based on receiving the identified request and having previously received at least one prior request for localization of the same string value from the source language to the target language, where the number of received requests exceeds a predetermined threshold value of requests, and wherein a second heuristic analysis is satisfied based on a determination that an identity or role of the particular user associated with the request for localization corresponds to a priority translation, wherein the second heuristic analysis causes the automatic triggering of the translation process regardless of whether the first heuristic analysis is satisfied; and in response to determining that no heuristic analysis is satisfied and that no prior localization of the string value from the source language to the target language has been previously translated, transmitting, via the network connection, a notification of unavailability of the requested localization in a translation repository to the particular user.

* * * * *